Mar. 13, 1923.
F. W. LUCKEL
VISOR FOR VEHICLES
Filed May 5, 1922
1,448,632
2 sheets-sheet 1
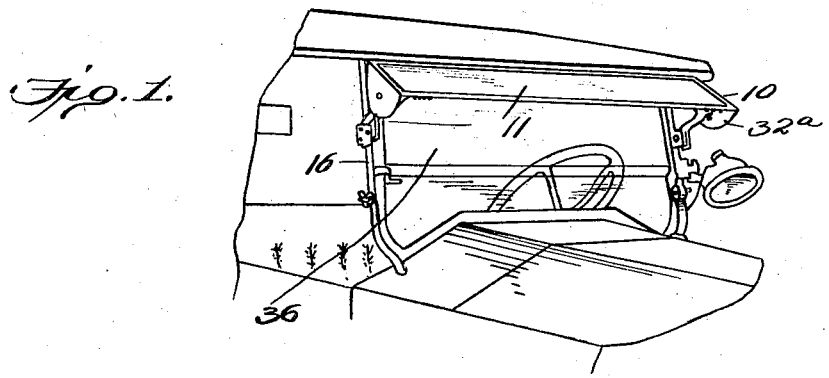
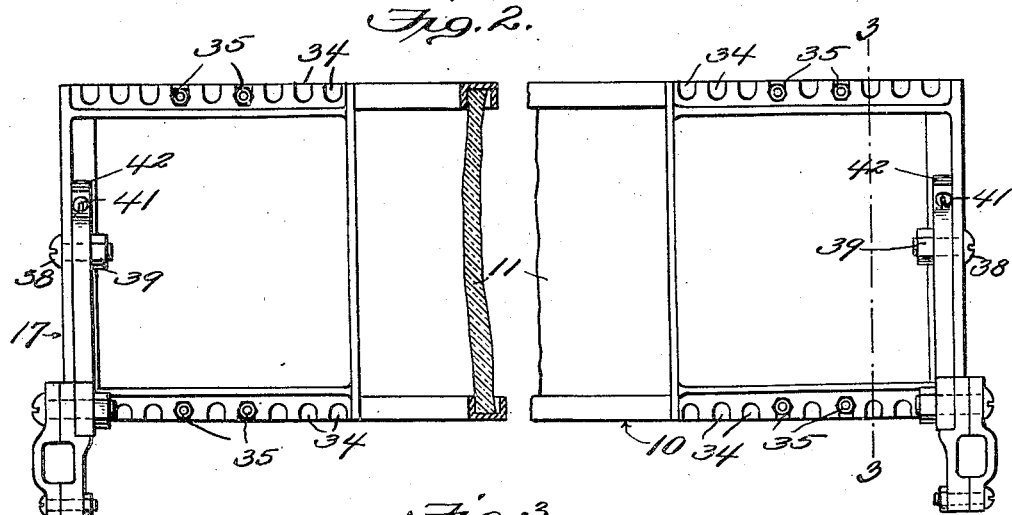
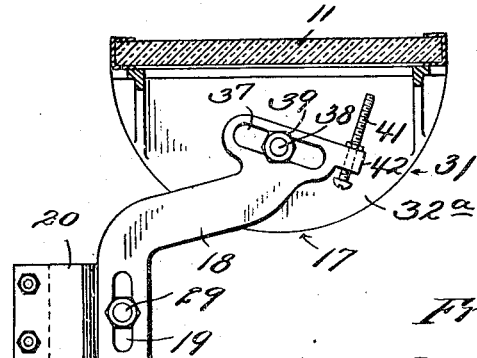
Inventor
Frederick W. Luckel
By
Attorney Mar. 13, 1923.

F. W. LUCKEL

VISOR FOR VEHICLES

Filed May 5, 1922

Inventor
Frederick W. Luckel

By
Attorney

Patented Mar. 13, 1923.

1,448,632

UNITED STATES PATENT OFFICE.

FREDERICK W. LUCKEL, OF ST. LOUIS, MISSOURI.

VISOR FOR VEHICLES.

Application filed May 5, 1922. Serial No. 558,683.

*To all whom it may concern:*

Be it known that I, FREDERICK W. LUCKEL, a citizen of the United States, residing at St. Louis city, in the State of Missouri, have invented new and useful Improvements in Visors for Vehicles, of which the following is a specification.

The present invention relates to visors for vehicles and particularly to the construction thereof and the adjustable mounting of the visor on the frame of the vehicle.

The primary object of the invention is to provide a visor the supports of which may be adjusted to any width of the vehicle frame and which may be locked against displacement while in adjusted position.

Other objects are to provide a visor which may be adjusted vertically, horizontally and angularly with relation to the front of a vehicle so as to be adapted to the needs of the driver and to the peculiar construction of the vehicle to which the device is attached to provide means for preventing side glare and to prevent snow or rain from beating in on the windshield from the front or side and obstructing the vision of the driver; and to provide a device of the class specified which is strong, durable and simple in construction, the parts of which are prevented from becoming loose and rattling.

In the drawings:

Fig. 1 shows the visor applied to an automobile;

Fig. 2 shows the visor on an enlarged scale compared with Fig. 1 detached from the vehicle;

Fig. 3 is a section on line 3—3, Fig. 2;

Figure 4:
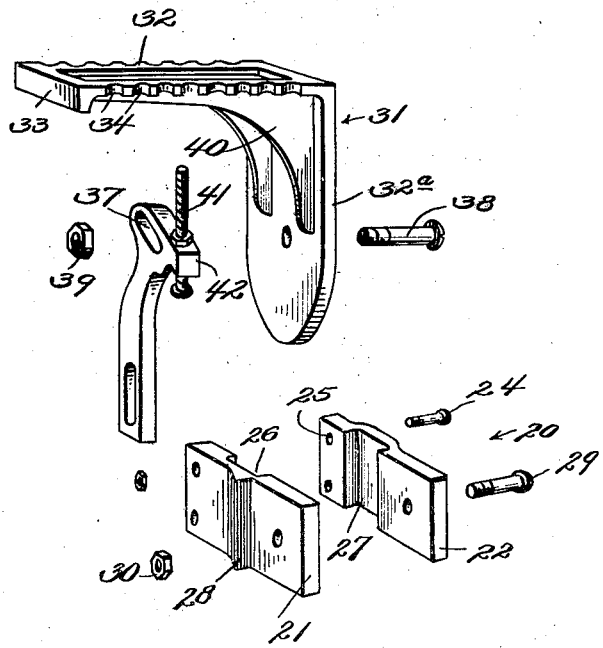
Fig. 4 is a detail view showing the parts of the supporting bracket disassembled.
Figure 5:
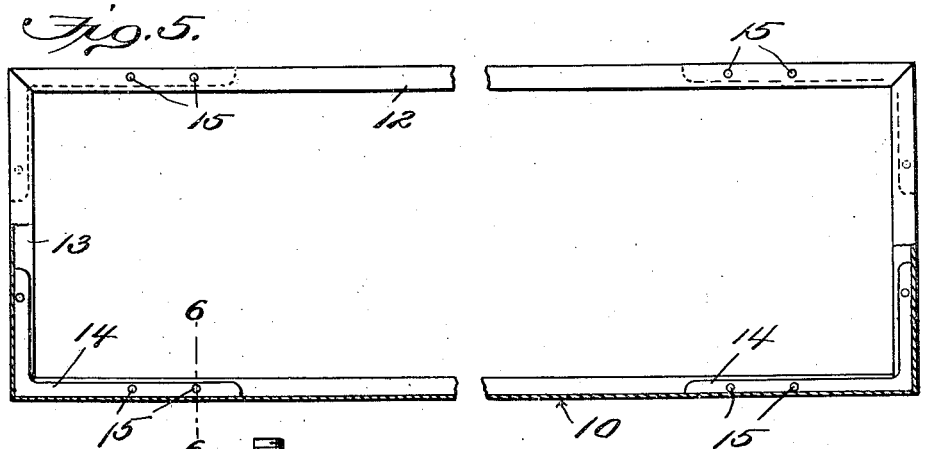
Fig 5 shows the visor frame, parts being broken away to show the construction thereof.
Figure 6:
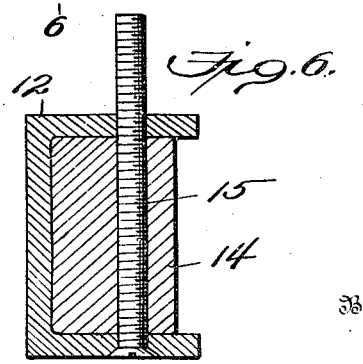
Fig. 6 is a section on the line 6—6, Fig. 5, on an enlarged scale as compared with said Fig. 5.

Referring to the drawings in detail by means of reference characters, 10 designates the frame of a visor and 11 a panel carried by said frame, said panel being of any suitable material which will protect the eyes of the driver of the car from the glare of the sun and the windshield from driving rain or snow. The panel is preferably of glass which may be colored green, blue, opal, or any other suitable or desirable color, so as not to shut off the direct vision of the driver through the panel but to soften the light striking his eyes therethrough.

The frame is made up preferably of channeled side and end members 12 and 13 detachably secured together as by angle members 14 received within the channels of the members 12 and 13 and secured thereto by screws 15, or other suitable fastenings. A packing of rubber may be received within the channel to cushion the panel and secure it against shock and chatter.

The frame is secured on standards 16 of the vehicle by brackets 31 and arms 18, preferably of the goose-neck variety and provided at their lower ends with slots 19. 20 designates standard clutches consisting of a pair of blocks 21 and 22 adapted to be secured together by suitable means such as screws or bolts 24 and 29 passing through apertures 25 formed in the blocks. The blocks are provided, respectively, with complementary channels 26 and 27, whereby said blocks are adapted to be clamped about standards 16 of the automobile. An abutment 28 is formed on one of the blocks of each pair, to provide supports for the lower ends of the arms and prevent angular movement thereof relative to the clutches. The lower ends of the arms are secured to the standard clutches 20 for vertical adjustment by means of bolts 29 passing through the slots 19. The bolts 29 also assist in securing the blocks 21 and 22 together and are provided with nuts 30 whereby the arms 18 may be held in adjusted position.

In order to adapt the visor to vehicles of different widths, the brackets 31 comprise arms 32 extending at right angles to a continuous web 32ª, the arms being connected at their ends by cross braces 33. The arms 32 are provided, preferably on their outer edges, with notches 34 adapted to receive bolts 35 extending through the frame of the visor to clamp the brackets in various positions of adjustment longitudinally of said frame. Slots might be substituted for the notches 34, but notches are preferable inasmuch as the bracket is thereby prevented from slipping relative to the visor frame.

The continuous webs 32ª of the bracket members are preferably made of metal, as for instance aluminum, and preferably are semicircular in shape so as to afford proper turning action of the visor for suitable protection against the glare of the sun or the driving of rain or snow in against the windshield 36 of the vehicle. This latter feature is of particular importance to a driver when running north or south. The upper ends of the arms 18 are provided with slots 37 arranged at a slight angle to the horizontal and the brackets 31 are mounted on the arms for horizontal and angular adjustment by means of bolts 38 passing through the slots 37 and are held in adjusted position by means of nuts 39. Corner braces 40 may be provided between the bracket members and the arms 32, to provide rigidity therebetween. Set screws 41 mounted in lugs 42 extend from the arms 18 and each have its free end adapted to engage one of the arms 32 of one of the brackets 31 to afford adjustable limits and supplementary supports for the visor.

What is claimed as new is:

1. In combination with a visor for vecles, brackets for supporting said visor, said brackets consisting of side webs and frames attached thereto on the standards of a vehicle, said supports having notches formed on opposite edges of said frames and means on said visor adapted to fit in said notches to maintain the brackets in adjusted relation to said visor.

2. In combination with a visor for vehicles, a pair of supports for securing the visor to the vehicle, said supports comprising clutches adapted to be secured to the vehicle, arms vertically adjustable on the clutches, and brackets angularly and horizontally adjustable on said arms, said brackets being secured to said visor for adjustment transversely of the vehicle.

3. In combination with a visor for vehicles, side webs, arms having slots in their upper and lower ends, means cooperating with the arms through the slot in the lower end for adjustably securing the arms to the standards of a vehicle, means cooperating with the arms through the slot in the upper end for adjustably securing the side webs to the arms, and means securing the web to the visor for adjustment of the web relative to the visor transversely of the vehicle.

In testimony whereof I have hereunto set my hand in presence of two subscribing witnesses.

FREDERICK W. LUCKEL.

Witnesses:
C. W. KOTSREAN,
FRANK J. KOTSREAN.